US008746897B2

(12) United States Patent
Tatsuno

(10) Patent No.: US 8,746,897 B2
(45) Date of Patent: Jun. 10, 2014

(54) IMAGE PROJECTOR HAVING AN OPTICAL PROJECTION SYSTEM WITH INDEPENDENTLY FOCUSING LENS

(75) Inventor: Hibiki Tatsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 241 days.

(21) Appl. No.: 13/315,679

(22) Filed: Dec. 9, 2011

(65) Prior Publication Data

US 2012/0154768 A1    Jun. 21, 2012

(30) Foreign Application Priority Data

Dec. 20, 2010   (JP) ................................ 2010-282684

(51) Int. Cl.
*G03B 21/14* (2006.01)
*G03B 21/20* (2006.01)
*G03B 21/26* (2006.01)
*G02B 3/00* (2006.01)
*G02B 9/00* (2006.01)

(52) U.S. Cl.
USPC ............... 353/94; 353/38; 353/102; 359/649

(58) Field of Classification Search
USPC ............... 353/38, 94, 98, 102, 122; 359/642, 359/648–651, 663, 676–677, 679–684, 359/686–698, 713–717, 726–727, 733–736, 359/799, 813–814
See application file for complete search history.

(56) References Cited

U.S. PATENT DOCUMENTS

| 7,186,039 | B2 * | 3/2007 | Mihara | 396/457 |
| 7,626,771 | B2 * | 12/2009 | Yokoyama | 359/754 |
| 7,679,834 | B2 * | 3/2010 | Hosokawa | 359/682 |
| 7,773,311 | B2 * | 8/2010 | Endo | 359/686 |
| 7,944,619 | B2 * | 5/2011 | Hosokawa | 359/678 |
| 2004/0184160 | A1 | 9/2004 | Nishina et al. | |
| 2005/0185288 | A1 | 8/2005 | Nishina et al. | |
| 2005/0195492 | A1 | 9/2005 | Nishina et al. | |
| 2005/0195493 | A1 | 9/2005 | Nishina et al. | |
| 2006/0044795 | A1 | 3/2006 | Tatsuno et al. | |

(Continued)

FOREIGN PATENT DOCUMENTS

| JP | 2008-165187 | 7/2008 |
| JP | 2009-229738 | 10/2009 |
| JP | 2009-251457 | 10/2009 |

OTHER PUBLICATIONS

U.S. Appl. No. 13/312,264, Dec. 6, 2011, Tatsuno.

*Primary Examiner* — Georgia Y Epps
*Assistant Examiner* — Jori S Reilly-Diakun
(74) *Attorney, Agent, or Firm* — Oblon, Spivak, McClelland, Maier & Neustadt, L.L.P.

(57) ABSTRACT

An optical projection system for projecting an enlarged image on a projection surface is provided. The optical projection system includes an image forming element, a coaxial optical system and a concave mirror. The coaxial optical system and the concave mirror are arranged in this order on an optical path from the image forming element to the projection surface. The coaxial optical system includes lens groups and an aperture stop that share an optical axis. The lens groups include a first lens group and other lens groups. The first lens group has negative refractive power and independently moves in an optical axis direction for adjusting the focus of the optical projection system. The aperture stop is arranged at a position closer to the image forming element than the first lens group that is arranged closest to the concave mirror among the lens groups having the negative refractive power.

8 Claims, 18 Drawing Sheets

(56) References Cited

U.S. PATENT DOCUMENTS

| | | |
|---|---|---|
| 2007/0024977 A1 | 2/2007 | Kawamura et al. |
| 2007/0297170 A1 | 12/2007 | Tatsuno |
| 2009/0091928 A1 | 4/2009 | Tatsuno |
| 2009/0257117 A1 | 10/2009 | Baba |
| 2010/0157421 A1 | 6/2010 | Abe et al. |

* cited by examiner

IMAGE PROJECTOR HAVING AN OPTICAL PROJECTION SYSTEM WITH INDEPENDENTLY FOCUSING LENS

BACKGROUND OF THE INVENTION

1. Field of the Invention

The disclosures generally relate to an optical projection system configured to enlarge an image and project the enlarged image on a projection surface, and an image projector including such an optical projection system.

2. Description of the Related Art

Liquid-crystal projectors are widely utilized as image projectors. Recent liquid-crystal projectors generally implement a higher definition of liquid crystal panels, higher luminance owing to improved efficiency of light source lamps, and reduction in price. Further, smaller and lightweight image projectors utilizing a digital micro-mirror device (DMD) are widely utilized not only in an office environment or a school environment but also at home. In particular, since recent front-type projectors have improved portability, they are frequently utilized in small conferences of several people.

In such image projectors, various focus-adjusting technologies have been disclosed for adjusting the focus on the screen. Japanese Patent Application Laid-Open Publication No. 2009-251457 (hereinafter referred to as "Patent Document 1"), for example, discloses a focus adjusting technology for an optical projection system. In this technology, the focus is adjusted by moving lens groups that form an optical projection system. In addition, Japanese Patent Application Laid-Open Publication No. 2009-229738 (hereinafter referred to as "Patent Document 2"), for example, discloses another focus adjusting technology for the optical projection system. In this technology, the focus is adjusted by moving focus lens groups in a lens system forming the optical projection system and an aspherical mirror, independently.

However, the focus adjusting technology disclosed in Patent Document 1 does not disclose directions in which respective lens groups are moved. Accordingly, distortion occurring during the focus adjustment may not be corrected by the technology disclosed in Patent Document 1. Further, in the focus adjusting technology disclosed in Patent Document 2, the aspherical mirror is moved. However, it is undesirable to move the aspherical mirror that performs distortion correction as a main function, because moving the aspherical mirror may accumulate positional errors between the aspherical mirror and other components. Accordingly, distortion occurring during the focus adjustment may not be corrected by the technology disclosed in Patent Document 2, similar to the technology disclosed in Patent Document 1.

It is a general object of at least one embodiment of the present invention to provide an optical projection system capable of correcting distortion that occurs while the focus is adjusted and an image projector including such an optical projection system.

SUMMARY OF THE INVENTION

In one embodiment, there is provided an optical projection system for projecting an enlarged image on a projection surface. The optical projection system includes an image forming element configured to form an image to be enlarged by the optical projection system, a coaxial optical system and a concave mirror. The coaxial optical system and the concave mirror are arranged in this order on an optical path from the image forming element to the projection surface. The coaxial optical system includes a plurality of lens groups and an aperture stop that share an optical axis. The lens groups include a first lens group and other lens groups, the first lens group having negative refractive power and configured to independently move in an optical axis direction for adjusting the focus of the optical projection system, and the aperture stop is arranged at a position closer to the image forming element than the first lens group having the negative refractive power, the first lens group being arranged closest to the concave mirror among the lens groups having the negative refractive power. In an optical projection system, if the other lens groups have negative refractive power, the focus is adjusted by moving the first lens group in a predetermined direction of the optical axis direction while moving the other lens groups in a direction opposite to the predetermined direction of the optical axis direction. If the other lens groups have positive refractive power, the focus is adjusted by moving the first lens group in the predetermined direction of the optical axis direction while moving the other lens groups in a direction the same as the predetermined direction of the optical axis direction. If the other lens groups include a second lens group having positive refractive power and a third lens group having negative refractive power, the focus is adjusted by moving the first lens group in the predetermined direction of the optical axis direction while moving the second lens group in a direction the same as the predetermined direction of the optical axis direction and the third lens group in a direction opposite to the predetermined direction of the optical axis direction.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

Figure 1:
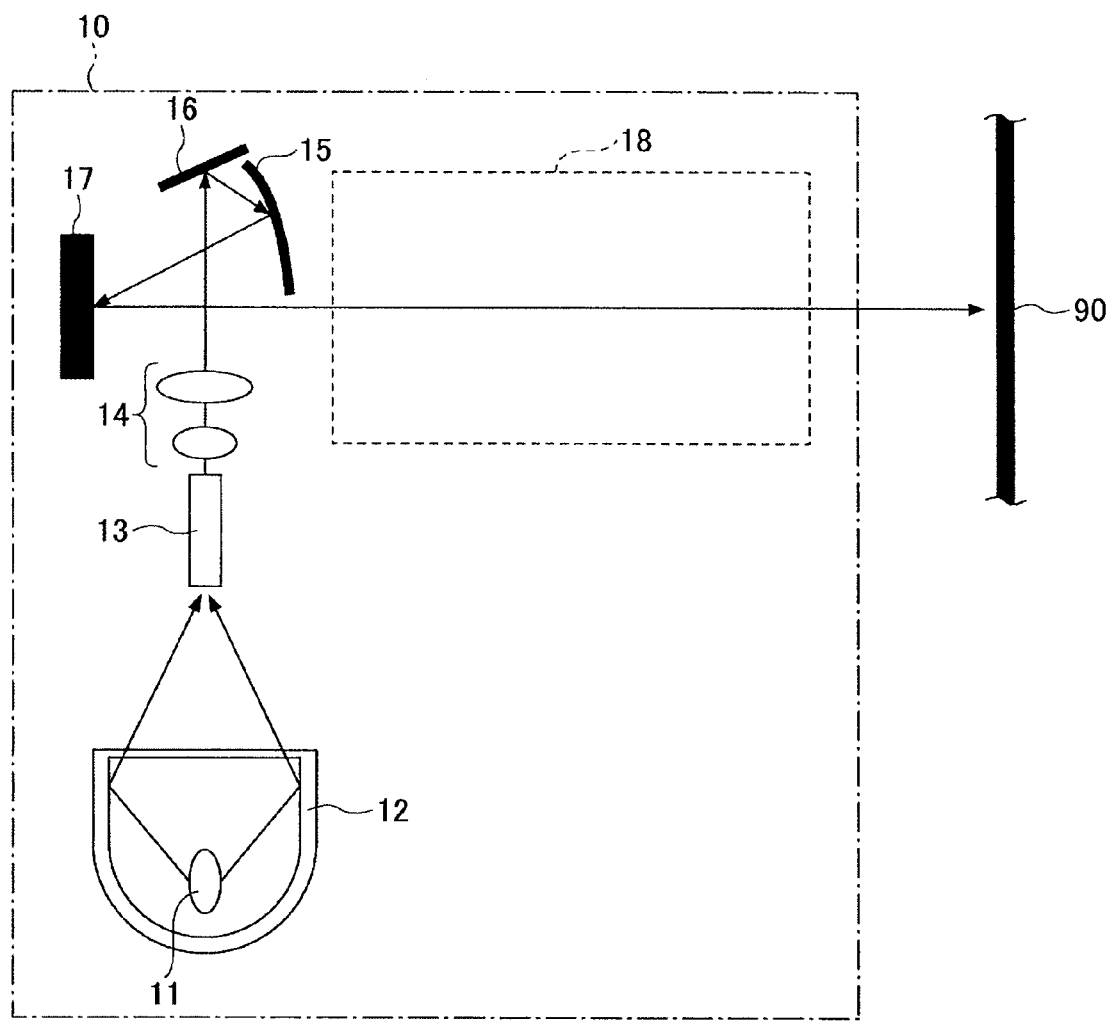
FIG. 1 is a schematic diagram illustrating an example of an image projector according to a first embodiment.

Preferred embodiments are described below with reference to the accompanying drawings. Note that in the drawings, same reference numerals are assigned to identical components, and overlapped descriptions are omitted. Note also that in the following embodiments, X (i.e., X-axis) represents a longitudinal direction (a horizontal direction) of a screen, Y (i.e., Y-axis) represents a short direction (a vertical direction) of the screen, and Z (i.e., Z-axis) represents a normal direction.

First Embodiment

FIG. 1 is a schematic diagram illustrating an example of an image projector according to a first embodiment. As illustrated in FIG. 1, in an image projector 10 according to the first embodiment, an optical projection system 18 applies light of a light source 11 to an image forming element 17 to enlarge an image formed by the image forming element 17, and project the enlarged image onto a screen 90. Examples of the light source 11 include a halogen lamp, a xenon lamp, a metal halide lamp, an ultra-high pressure mercury lamp, an LED, and the like. Examples of the image forming element 17 include the digital micro-mirror device (DMD), a liquid crystal panel, and the like.

Hereinafter, the image projector 10 is specifically described. Light emitted from the light source 11 is converged by a reflector 12 at an entrance of an integrator rod 13. The integrator rod 13 may be a light pipe formed by combining four mirrors in the shape of a tunnel. The light converged at the entrance of the integrator rod 13 repeatedly reflects off the mirrors inside the integrator rod 13 and uneven light intensity becomes uniform at an exit of the integrator rod 13 as a result. The exit of the integrator rod 13 may serve as a surface light source configured to emit light having uniform light intensity. Accordingly, a light source image of the surface light source may be formed on the image forming element 17 via an illumination lens 14, a first mirror 15, and a second mirror 16. Since the image forming element 17 is illuminated with light in a uniform illumination distribution, an enlarged light source image of the image of the image forming element 17 projected onto a screen 90 may also have a uniform illumination distribution.

If the image forming element 17 is a DMD, the image forming element 17 includes numerous micro-mirrors, respective angles of which may be changed in a range of −12 degrees to +12 degrees. For example, an angle of illumination light directed toward the DMD may be set such that the reflected light reflected off the micro-mirrors may enter the optical projection system 18 when the angles of the micro-mirrors are −12 degrees, and the reflected light reflected off the micro-mirrors may not be allowed to enter the optical projection system 18 when the angles of the micro-mirrors are +12 degrees. With this configuration, a digital image may be formed on the screen 90 by controlling inclination angles of the micro-mirrors of the DMD.

Note that two or more image forming elements 17 may be prepared for illumination light having passed through respective color filters (red, green and blue) to the respective image forming elements 17, and light synthesized by a color synthesis unit may be allowed to enter the optical projection system 18. Accordingly, a color image may be projected onto the screen 90.

Figure 2:
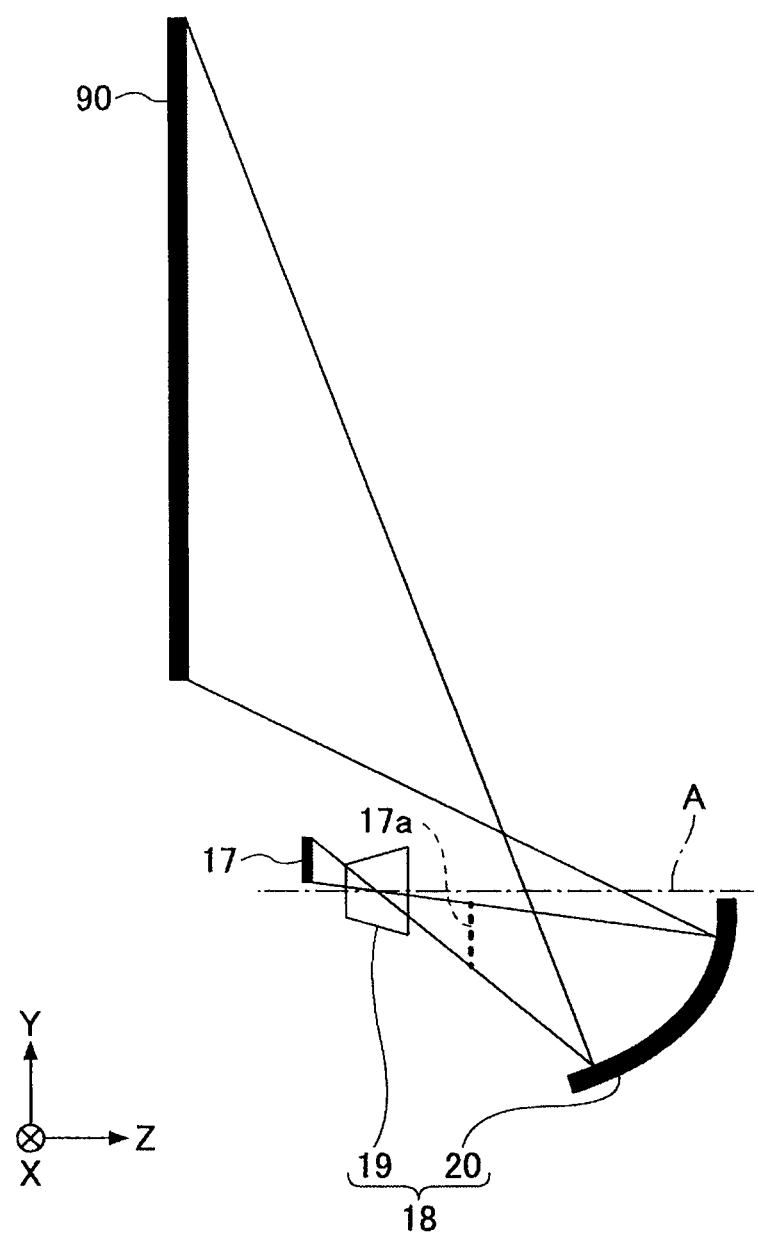
FIG. 2 is a diagram illustrating an example of an optical path of the optical projection system according to the first embodiment.

FIG. 2 is a diagram illustrating an example of an optical path of the optical projection system 18 according to the first embodiment. Referring to FIG. 2, the optical projection system 18 includes a coaxial optical system 19 formed of a lens group and a concave mirror 20 serving as a non-coaxial optical system that does not share optical paths with the coaxial optical system 19. The optical projection system 18 may include two or more concave mirrors. Note that "A" in FIG. 19 indicates an optical axis of the coaxial optical system 19. In the optical projection system 18, an intermediate image 17a of the image forming element 17 is temporarily formed in the coaxial optical system 19, and the intermediate image 17a is then enlarged by the concave mirror 20. The enlarged image is projected onto the screen 90 in this manner. Note that a specific configuration of the coaxial optical system 19 is described later.

Figure 3:
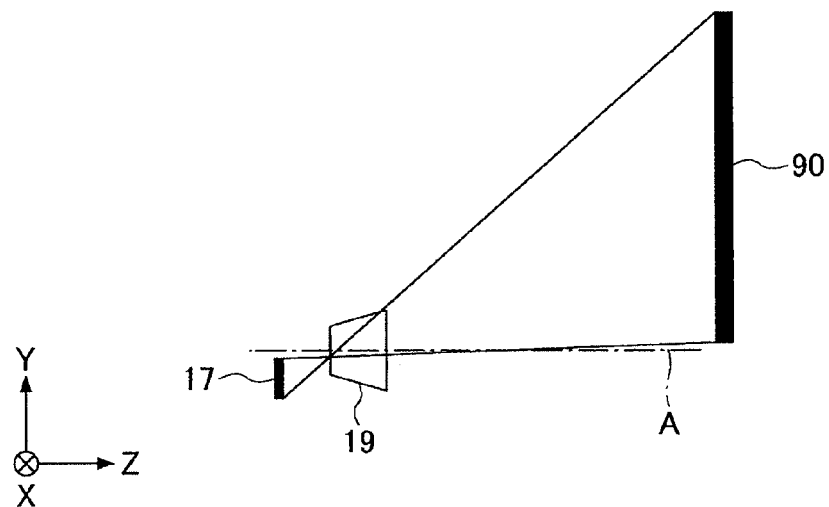
FIG. 3 is a diagram (part 1) illustrating a concave mirror.

The concave mirror 20 is described further in detail. In order to project an image on the screen 90 at close range, it may be necessary to form the image at a position above the image projector for facilitating the viewability of the projected image. For example, the image forming element 17 is arranged not on an optical axis A of the coaxial optical system 19 but is eccentrically arranged (i.e., arranged off the optical axis A of the coaxial optical system 19) as illustrated in FIG. 3. With this arrangement, the coaxial optical system 19 may acquire a wider performance assurance range (i.e., serve as wide-angle lens), which may maintain image quality. However, the wide-angle lens of the coaxial optical system 19 may have limitations. Hence, in order to project the image on the screen 90 at an extremely closer range utilizing the coaxial optical system 19, it may be necessary to increase the optical path by incorporates a system illustrated in FIG. 3. However, in this system, it may be difficult to attach a mirror to a portable image projector, which is generally utilized in an ordinary conference room. Even if the mirror is attached to the portable image projector, the attached mirror may need to be a larger sized one. Accordingly, larger space and higher cost may be required for attaching the mirror to the portable image projector. Thus, it may not be desirable to utilize the system illustrated in FIG. 3.

Figure 4:
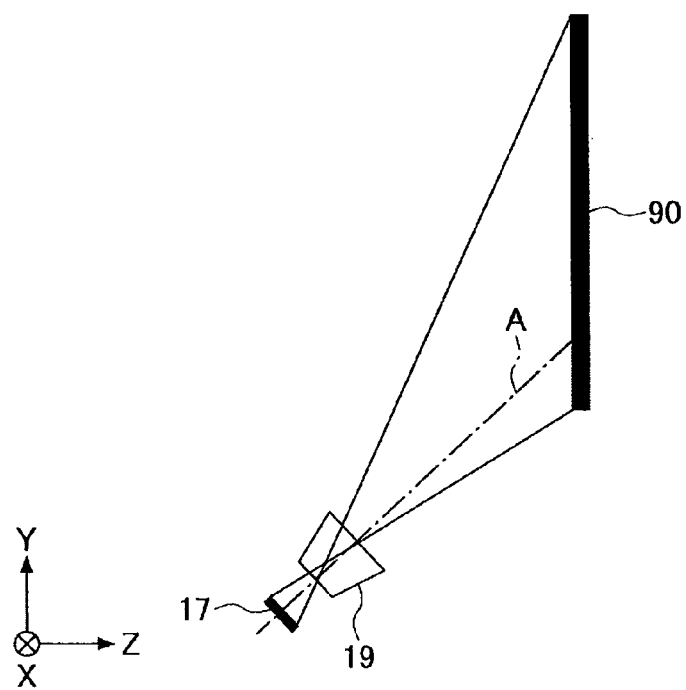
FIG. 4 is a diagram (part 2) illustrating the concave mirror.

There is a system differing from the system illustrated in FIG. 3, in which an image is obliquely projected by utilizing a concave mirror. FIG. 4 illustrates an example of an oblique projection system. As illustrated in FIG. 4, the image may be projected at closer range by arranging the image forming element 17 or the coaxial optical system 19 obliquely to the screen 90 in the oblique projection system. With this oblique projection system, the image may be projected at extremely close range; however, the projected image may be distorted in a trapezoidal shape. Thus, it may not be desirable to utilize the system illustrated in FIG. 4.

Figure 5:
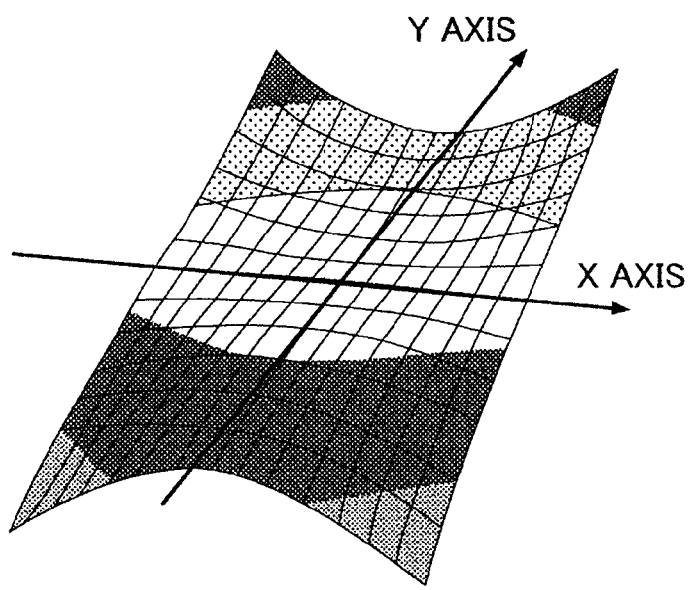
FIG. 5 is a diagram (part 3) illustrating the concave mirror.

In view of the disadvantages of the systems illustrated in FIGS. 3 and 4, the optical projection system 18 according to the first embodiment effectively corrects such a trapezoidally-distorted image by arranging the optical system and by utilizing a free-form surface mirror as the concave mirror 20 as illustrated in FIG. 2. Note that FIG. 5 illustrates an example of the free-form surface mirror. In the free-form surface mirror, the curvature in an X-axis direction changes according to values of coordinates in a Y-axis direction. More specifically, if the horizontal direction and the vertical direction of the screen 90 are respectively defined as the X-axis direction and the Y-axis direction, curvature of the concave mirror 20 in an X-axis direction may increase as the values of the coordinates increase in the Y-axis direction from the end of the concave mirror 20, which resides in a position closest from the optical axis A of the coaxial optical system 19, and a position farthest from the optical axis A of the coaxial optical system 19.

Note that in this embodiment, the concave mirror 20 is fixed and therefore not moved when the focus is adjusted. If the concave mirror 20 that is large and serves a most important function is moved during focus adjustment, a positional error in relation to the coaxial optical system 19 may be increased, which may further degrade the distortion.

The function of the optical projection system 18 is to form a real image of the image forming element 17 onto the screen 90. The desired size of the image to be displayed on the screen 90 or a desired distance from the image projector 10 to the screen 90 may vary among different users of the image projector 10. In order to form the real image of the image forming element 17 onto the screen 90, the focus of the optical projection system 18 may need to be adjusted. In an optical projection system of an ordinary projector (i.e., coaxial optical system having rotational symmetry), there may be used an entire optical projection system in which the focus is adjusted by moving an entire optical projection system, or a focus adjusting system in which the focus is adjusted by moving a lense in the optical projection system, or one of the lens groups each formed of a set of lenses in the optical projection system.

In the optical projection system 18 according to the first embodiment, it is most desirable to employ a focus adjusting system in which the focus is adjusted by fixing one of the lenses (or one of the lens groups) closest to the image forming element 17 and moving the remaining two lenses (or two lens groups) along the optical axis direction. The reason that the aforementioned focus adjusting system, in which the focus is adjusted by moving the remaining two lenses (or two lens groups) along the optical axis direction while one of the lenses (or one of the lens groups) closest to the image forming element 17 is fixed, is most desirable is as follows. Image distortion that has occurred when the image is projected on the screen 90 at close range is mainly corrected by the concave mirror 20 that is a non-coaxial optical system. Accordingly, the image distortion may not sufficiently be corrected by simply moving the entire optical projection system or by simply moving one of the lenses in the optical projection system or one of the lens groups in the optical projection system. Further, the brightness may not be changed with screen sizes by fixing one of the lens groups arranged closest to the image forming element 17.

Figure 6:
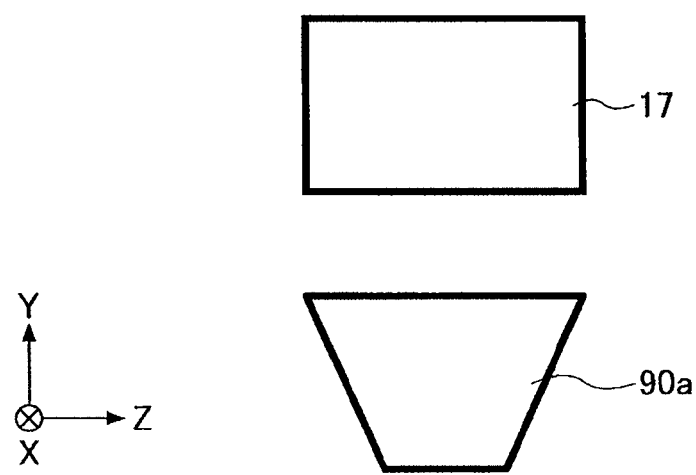
FIG. 6 is a diagram (part 1) illustrating distortion of an image projected onto a projection surface.
Figure 7:
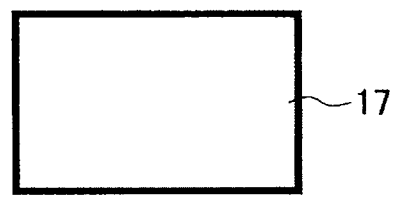
FIG. 7 is a diagram (part 2) illustrating distortion of the image projected onto the projection surface.
Figure 7:
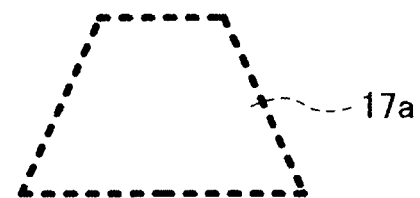
Figure 7:
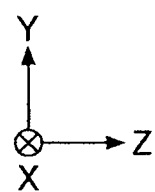
Figure 7:
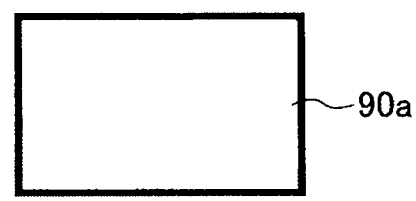

Hereafter, the optical projection system 18 is specifically described. In a case of the oblique projection illustrated in FIG. 4, the rectangular image forming element 17 is displayed distorted as a trapezoidal shape having an upper side longer than a lower side on an image 90a as illustrated in FIG. 6. By contrast, in the optical projection system 18 illustrated in FIG. 7, the intermediate image 17a may be largely distorted, which is so-called "pincushion distortion" that displays the lower side of the intermediate image 17a longer than the upper side of the intermediate image 17a at the upper part of the screen 90, and such image distortion may be adjusted by the concave mirror 20 to form the distorted image in a rectangular shape.

Figure 8:
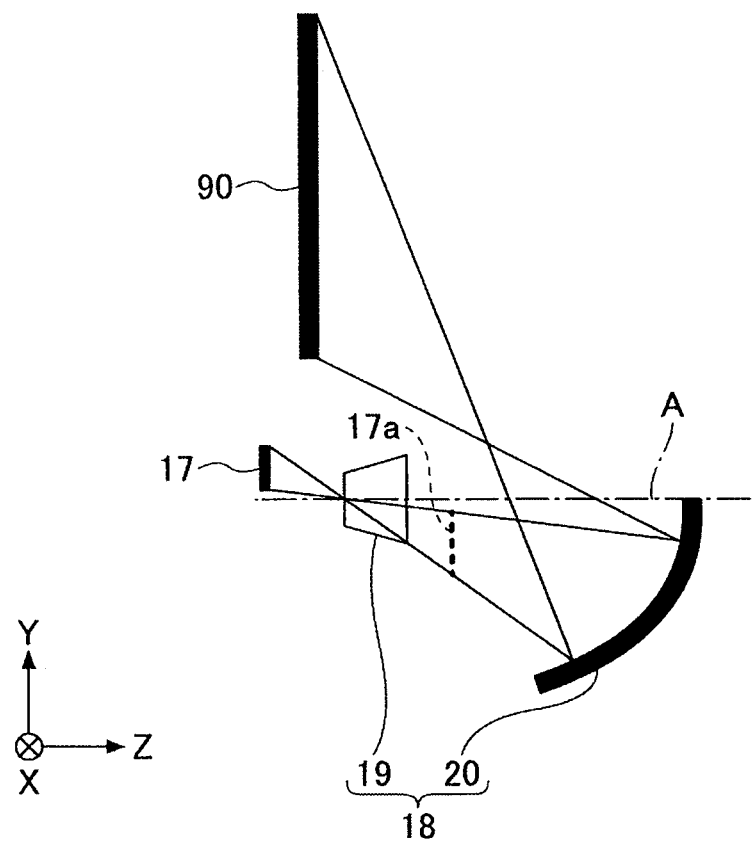
FIG. 8 is a diagram (part 3) illustrating distortion of the image projected onto the projection surface.
Figure 9:
FIG. 9 is a diagram (part 4) illustrating distortion of the image projected onto the projection surface.
Figure 9:
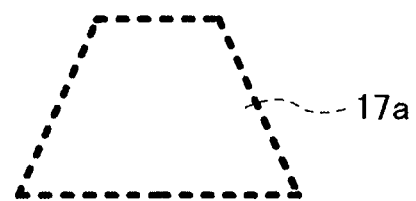
Figure 9:
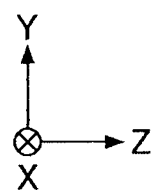
Figure 9:
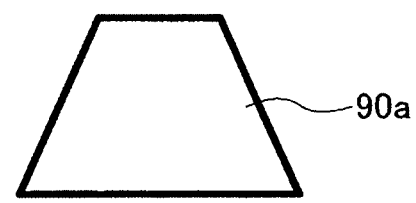

However, if the focus is adjusted by moving the screen 90 in a Z-axis direction and moving the entire coaxial optical system 19 in the Z-axis direction so as to display a screen smaller than the screen 90 of FIG. 2, as illustrated in FIG. 8, there may be little change in the distortion of the intermediate image 17a. As a result, the image 90a on the screen 90 is distorted in a trapezoidal shape (trapezoidal distortion) having an upper side shorter than a lower side illustrated in FIG. 9.

Figure 10:
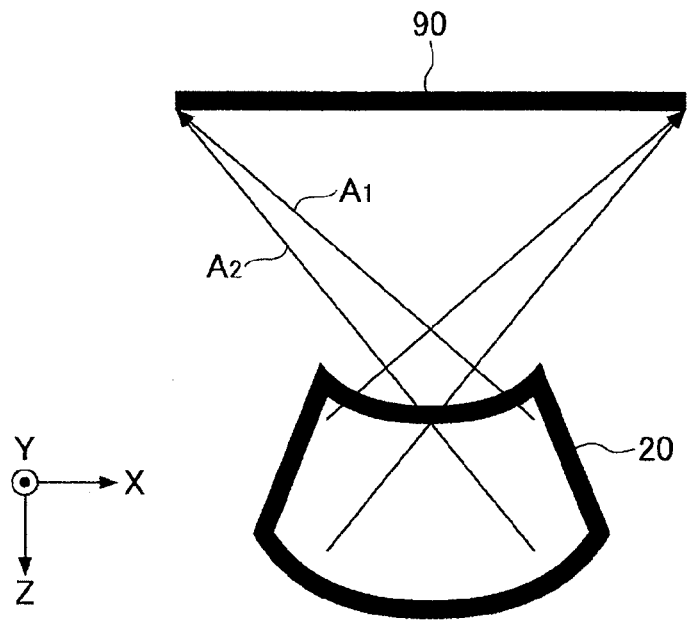
FIG. 10 is a diagram (part 5) illustrating distortion of the image projected onto the projection surface.
Figure 11:
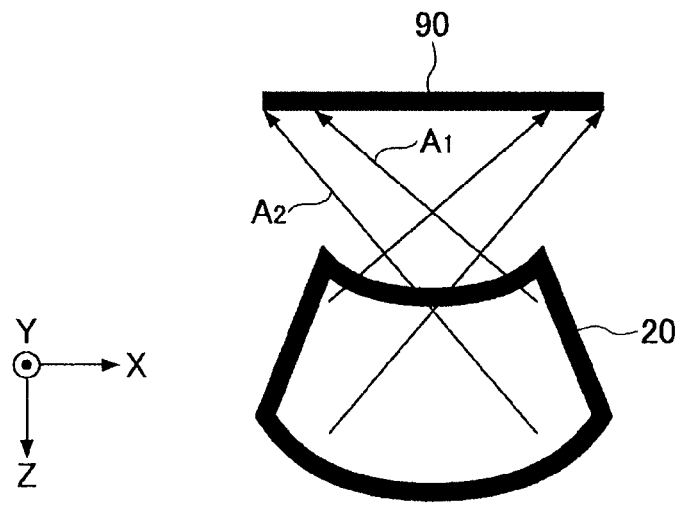
FIG. 11 is a diagram (part 6) illustrating distortion of the image projected onto the projection surface.

The trapezoidal distortion is described further in detail. FIG. 10 is a cross-sectional diagram illustrating the concave mirror and the screen of FIG. 2. FIG. 11 is a cross-sectional diagram illustrating the concave mirror and the screen of FIG. 8. As illustrated in FIGS. 10 and 11, in the optical projection system 18 utilizing the concave mirror 20, an angle of light A1 directing towards an upper part of the screen 90 in the Y-axis direction differs from an angle of light A2 directing towards a lower part of the screen 90 in the Y-axis direction in an XZ cross section. Accordingly, if the screen 90 is moved to a position illustrated in FIG. 8, the formed image position of an upper part of the screen 90 differs from the image formed position of a lower part of the screen 90 in the X-axis direction. Accordingly, the trapezoidal distortion having an upper side shorter than a lower side may be observed as illustrated by the image 90a in FIG. 9.

Figure 12:
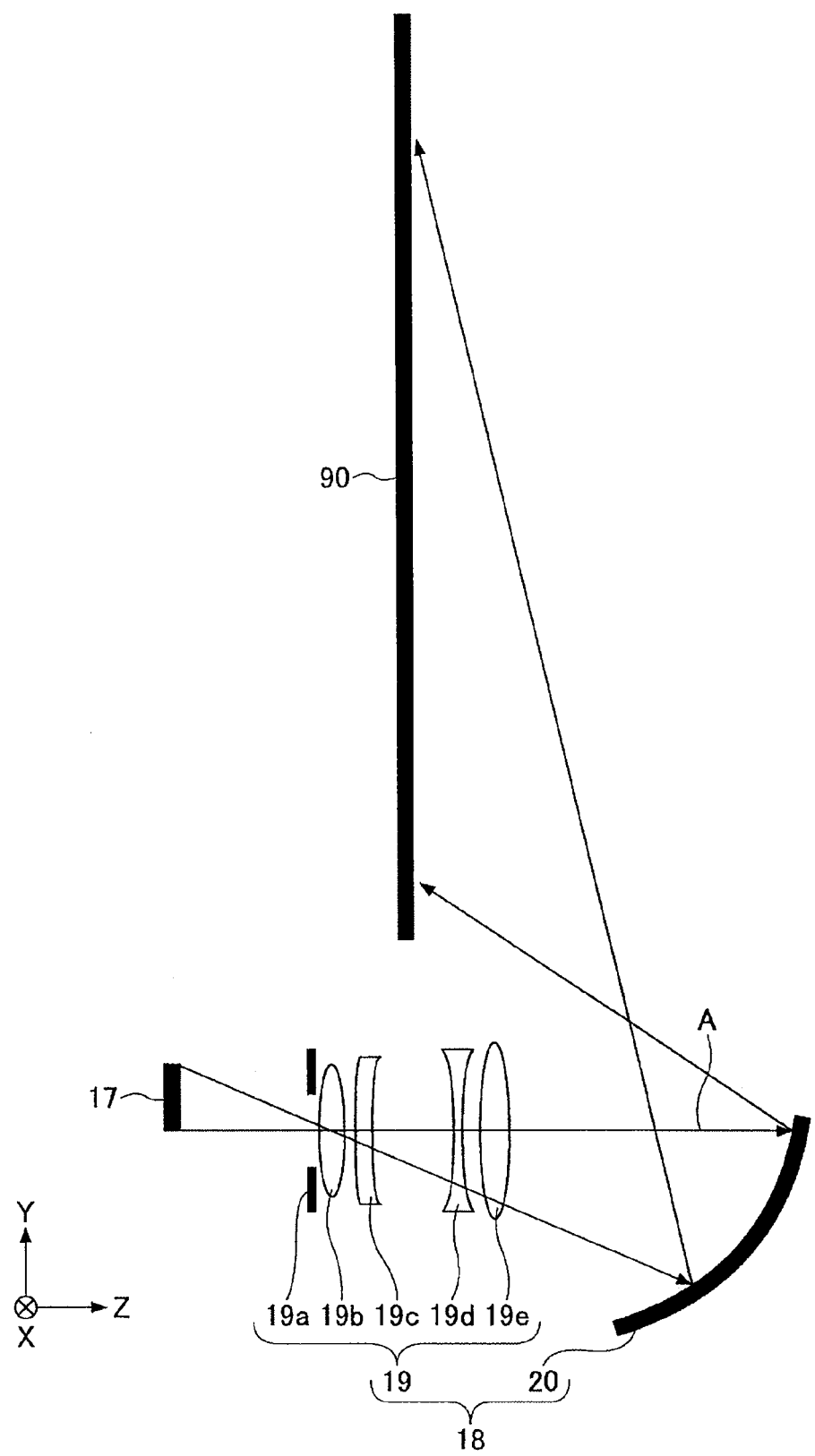
FIG. 12 is a diagram (part 1) illustrating focus adjustment in the optical projection system according to the first embodiment.

In order to overcome such trapezoidal distortion, the coaxial optical system 19 of the optical projection system 18 according to this embodiment includes a configuration illustrated in FIG. 12. That is, the coaxial optical system 19 in this embodiment includes an aperture stop 19a, lens groups 19b, 19c, 19d and 19e that are arranged in this order from the image forming element 17 side. Note that each of the above lens groups may be formed of one or more lenses.

In the coaxial optical system 19, the lens group 19b includes positive refractive power. The lens group 19c includes negative refractive power. The lens group 19d includes negative refractive power. The lens group 19e includes positive refractive power.

The lens groups 19b and 19e are fixed whereas the lens groups 19c and 19d are configured to move independently from each other and reciprocally move in the Z-axis direction (i.e., the optical "A" axis direction). That is, the coaxial optical system 19 employs a floating focus adjusting system, in which the focus is adjusted by moving the plural lens groups (lens groups 19c and 19d) in amounts differing from each other in the Z-axis direction (i.e., the optical "A" axis direction).

Note that the lens group 19c is one of the lens groups having negative refractive power and configured to reciprocally move in the Z-axis direction. Of the negative refractive power groups, the lens group 19c is arranged closest to the aperture stop 19a. The lens group 19d is one of the lens groups having negative refractive power and configured to reciprocally move in the Z-axis direction. Of the negative refractive power groups, the lens group 19d is arranged closest to the concave mirror 20.

The aperture stop 19a is arranged at a position closer to the image forming element 17 than the lens group 19d that is arranged closest to the concave mirror 20 among the lens groups that have negative refractive power and are configured to reciprocally move in the Z-axis direction. Note that it is preferable to arrange the aperture stop 19a at a position closer to the image forming element 17 as illustrated in FIG. 12, so as to generate a large amount of pincushion distortion.

Figure 13:
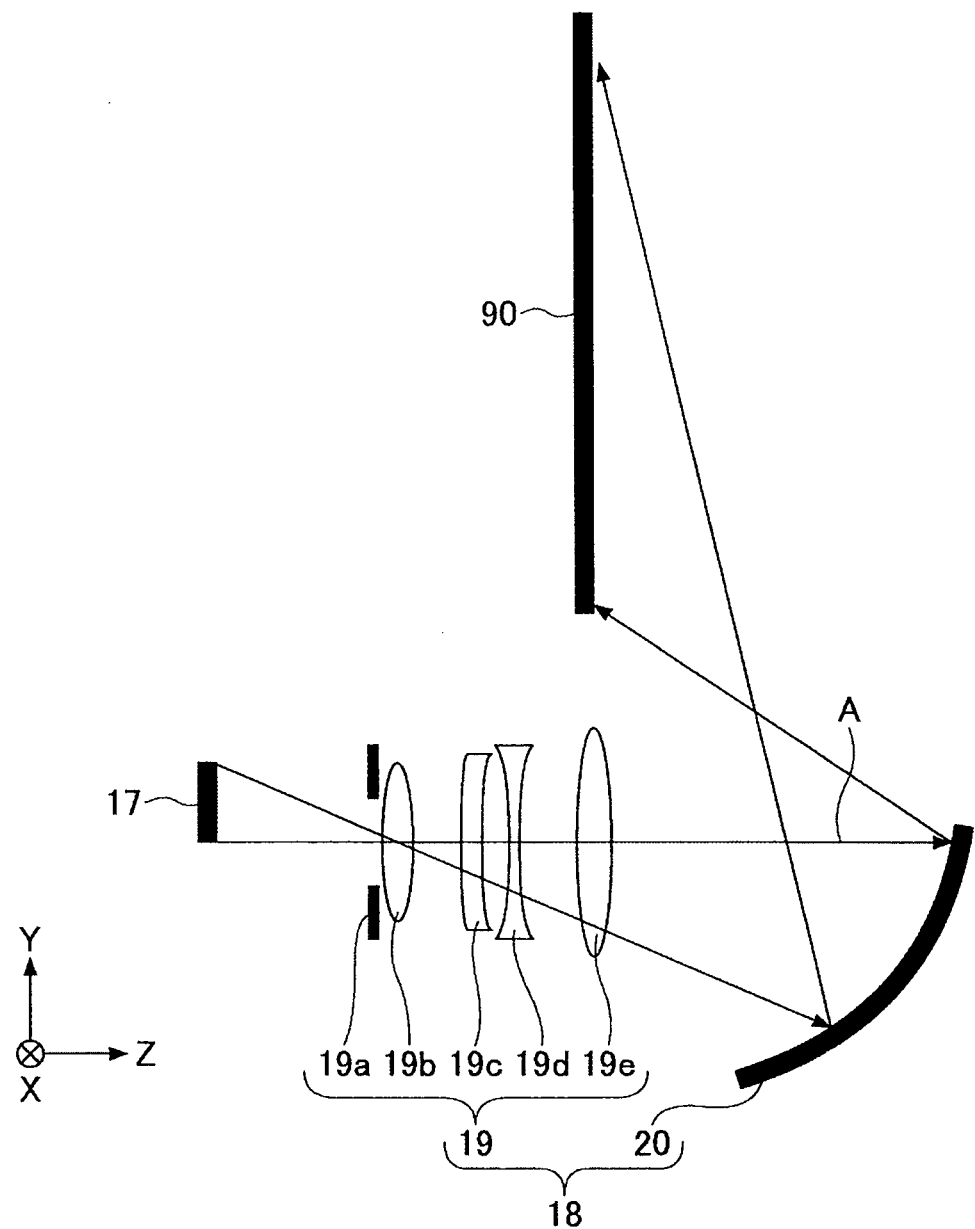
FIG. 13 is a diagram (part 2) illustrating focus adjustment in the optical projection system according to the first embodiment.
Figure 14:
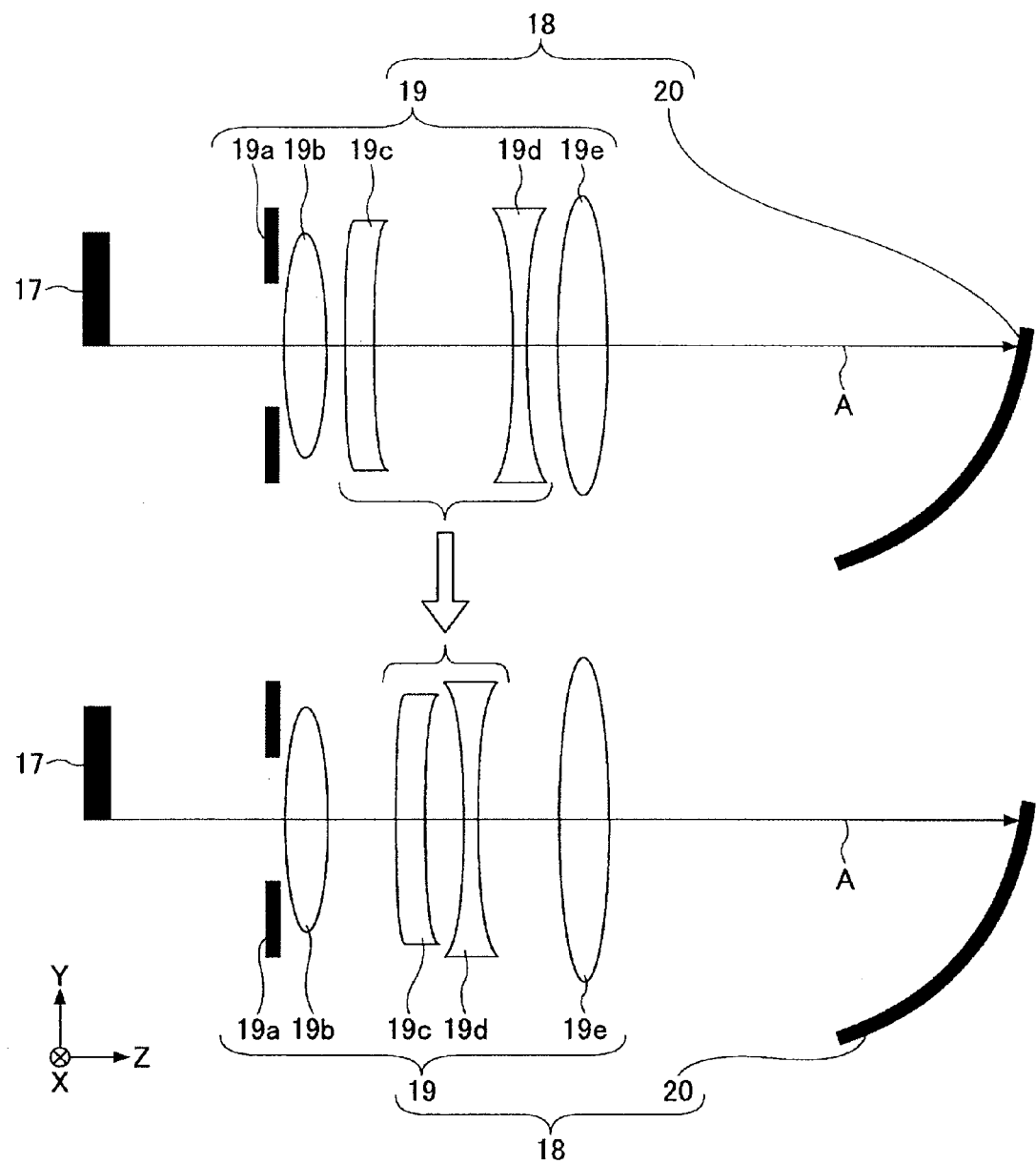
FIG. 14 is a diagram (part 3) illustrating focus adjustment in the optical projection system according to the first embodiment.

If the screen 90 is moved from a position illustrated in FIG. 12 closer to the concave mirror 20 as illustrated in FIG. 13 so as to implement a smaller screen sized projection, and the focus is adjusted at the same time, the lens groups 19c and 19d are moved in the Z-axis direction (i.e., the optical "A" axis direction) as illustrated in FIG. 14. More specifically, the lens group 19c is moved in the Z-axis direction (i.e., the optical "A" axis direction) such that the lens group 19c moves away from the aperture stop 19a, and the lens group 19d is moved reciprocally in the Z-axis direction (i.e., the optical "A" axis direction) such that the lens group 19d moves closer to the aperture stop 19a.

The lens group 19d has the strongest negative refractive power specifically, such that the lens group 19d may be able to generate a larger amount of pincushion distortion. Since the amount of distortion in the intermediate image 17a may be lowered by moving the lens group 19d closer to the aperture stop 19a, the trapezoidal distortion such as the image 90a illustrated in FIG. 9 may be suppressed. Note that if the screen 90 is moved away from the concave mirror 20 so as to implement a larger screen sized projection, and the focus is adjusted at the same time, contrary to the case in FIG. 14, the lens group 19c may be moved in the Z-axis direction (i.e., the optical "A" axis direction) such that the lens group 19c moves closer to the aperture stop 19a, and the lens group 19d may be moved in the Z-axis direction (i.e., the optical "A" axis direction) such that the lens group 19d moves away from the aperture stop 19a.

Thus, in the first embodiment, the coaxial optical system 19 employs a floating focus adjusting system, in which the focus is adjusted by moving the plural lens groups within the coaxial optical system 19 in amounts differing from each other in the Z-axis direction (i.e., the optical "A" axis direction). When the screen 90 is moved closer to the concave mirror 20 side so as to implement a smaller screen sized projection, and the focus is adjusted at the same time, the lens group 19c which is arranged closest to the aperture stop 19a among the lens groups that have negative refractive power is moved in the Z-axis direction (i.e., the optical "A" axis direction), such that the lens group 19c moves away from the aperture stop 19a, and the lens group 19d which is arranged closest to the concave mirror 20 among the lens groups that have negative refractive power is moved reciprocally in the Z-axis direction (i.e., the optical "A" axis direction), such that the lens group 19d moves closer to the aperture stop 19a. With this configuration, the pincushion distortion of the intermediate image 17a may be suppressed, and the trapezoidal image distortion of the image on the screen 90 may be suppressed.

Further, when the screen 90 is moved away from the concave mirror 20 so as to implement a larger screen sized projection, and the focus is adjusted at the same time, contrary to the above case, the lens group 19c may be moved reciprocally in the Z-axis direction (i.e., the optical "A" axis direction) such that the lens group 19c moves closer to the aperture stop 19a, and the lens group 19d may be moved in the Z-axis direction (i.e., the optical "A" axis direction) such that the lens group 19d moves away from the aperture stop 19a. With this configuration, a large amount of pincushion distortion of the intermediate image 17a may be generated, and the trapezoidal image distortion of the image on the screen 90 may be suppressed.

Note that in order to adjust a large amount of pincushion distortion of the image, it may be effective to move the lens group 19d in the Z-axis direction (i.e., the optical "A" axis direction) such that the lens group 19d moves closer to the aperture stop 19a. The image distortion may be effectively corrected by moving the lens group having positive refractive power away from the aperture stop 19a. However, if the lens group having positive refractive power is arranged closer to the concave mirror 20, a large amount of pincushion distortion may be generated in the intermediate image 19a, or increasing the lateral magnification of the intermediate image 17a may become difficult. Thus, it may be undesirable to move the lens group having positive refractive power away from the aperture stop 19a.

Further, the distortion may be converged by significantly moving the lens group 19d, and the focal shift caused by excessive amount of movement as a driving focus may be corrected by moving the lens group 19c configured to generate less amount of distortion in a direction opposite to the direction in which the lens group 19d is moved. That is, it may be possible to significantly move the lens group 19d by arranging the lens group 19c configured to generate less amount of distortion.

Second Embodiment

Figure 15:
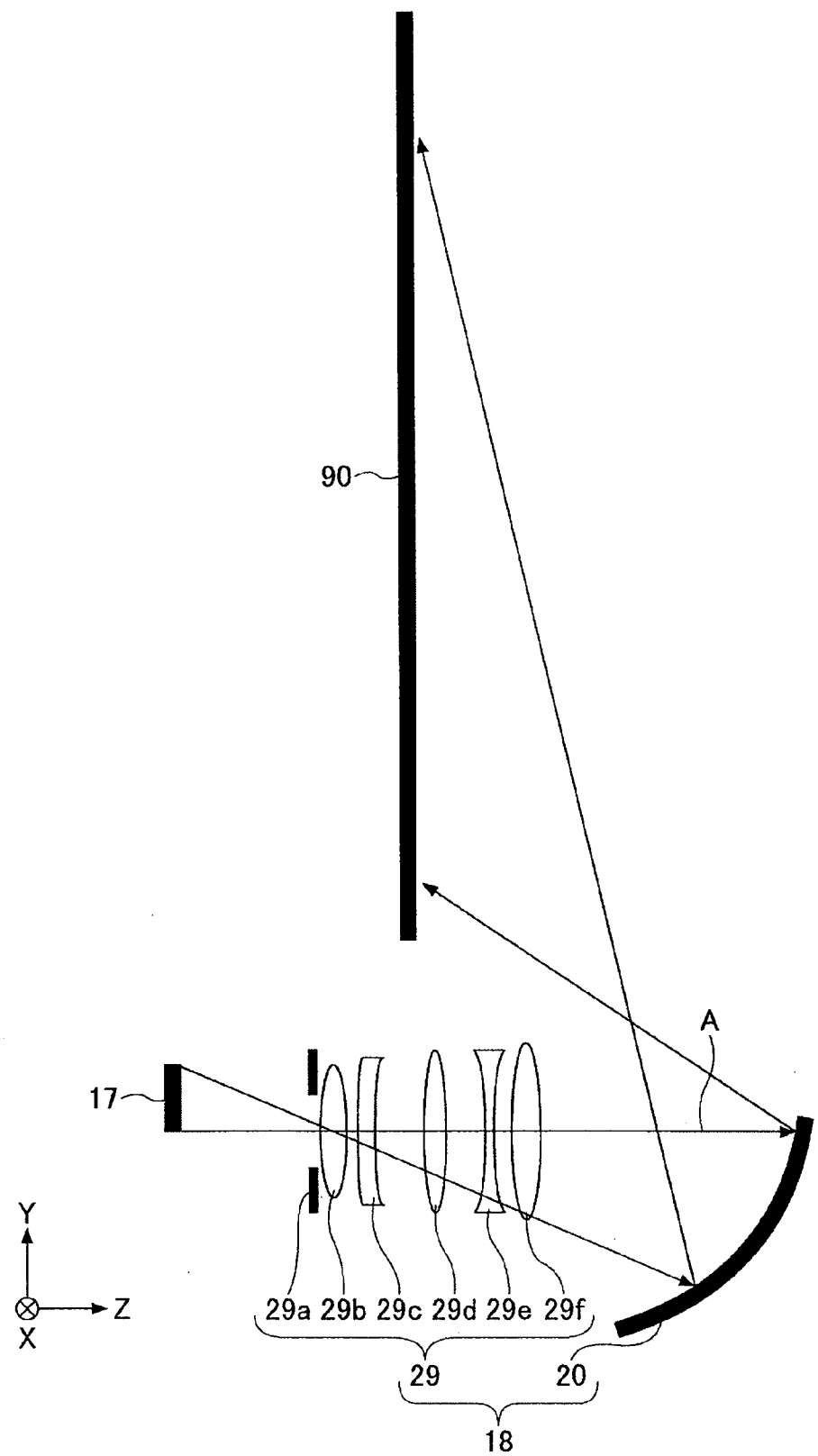
FIG. 15 is a diagram (part 1) illustrating focus adjustment in an optical projection system according to a second embodiment.

In a second embodiment, a coaxial optical system 29 of the optical projection system 18 includes a configuration illustrated in FIG. 15. That is, the coaxial optical system 29 in this embodiment includes an aperture stop 29a, lens groups 29b, 29c, 29d, 29e and 29f that are arranged in this order from the image forming element 17 side. Note that illustration of components identical to those illustrated in the first embodiment may be omitted from the second embodiment.

In the coaxial optical system 29, the lens group 29b includes positive refractive power. The lens group 29c includes negative refractive power. The lens group 29d includes positive refractive power. The lens group 29e includes negative refractive power. The lens group 29f includes positive refractive power.

The lens groups 29b and 29f are fixed whereas the lens groups 29c, 29d and 29e are configured to move independently from one another and reciprocally move in the Z-axis direction (i.e., the optical "A" axis direction). That is, the coaxial optical system 29 employs a floating focus adjusting system, in which the focus is adjusted by moving the plural lens groups (lens groups 29c, 29d and 29e) in amounts differing from one another in the Z-axis direction (i.e., the optical "A" axis direction).

Note that the lens group 29c is one of the lens groups having negative refractive power and configured to reciprocally move in the Z-axis direction, which is arranged closest to the aperture stop 29a. The lens group 29b is one of the lens groups having positive refractive power and configured to reciprocally move in the Z-axis direction, which is arranged closest to the aperture stop 29a. The lens group 29e is one of the lens groups having negative refractive power and configured to reciprocally move in the Z-axis direction, which is arranged closest to the concave mirror 20.

The aperture stop 29a is arranged at a position closer to the image forming element 17 than the lens group 29e that is arranged closest to the concave mirror 20 among the lens groups that have negative refractive power and are configured to reciprocally move in the Z-axis direction. Note that it is preferable to arrange the aperture stop 29a at a position closer to the image forming element 17 as illustrated in FIG. 15, so as to generate a large amount of pincushion distortion.

Figure 16:
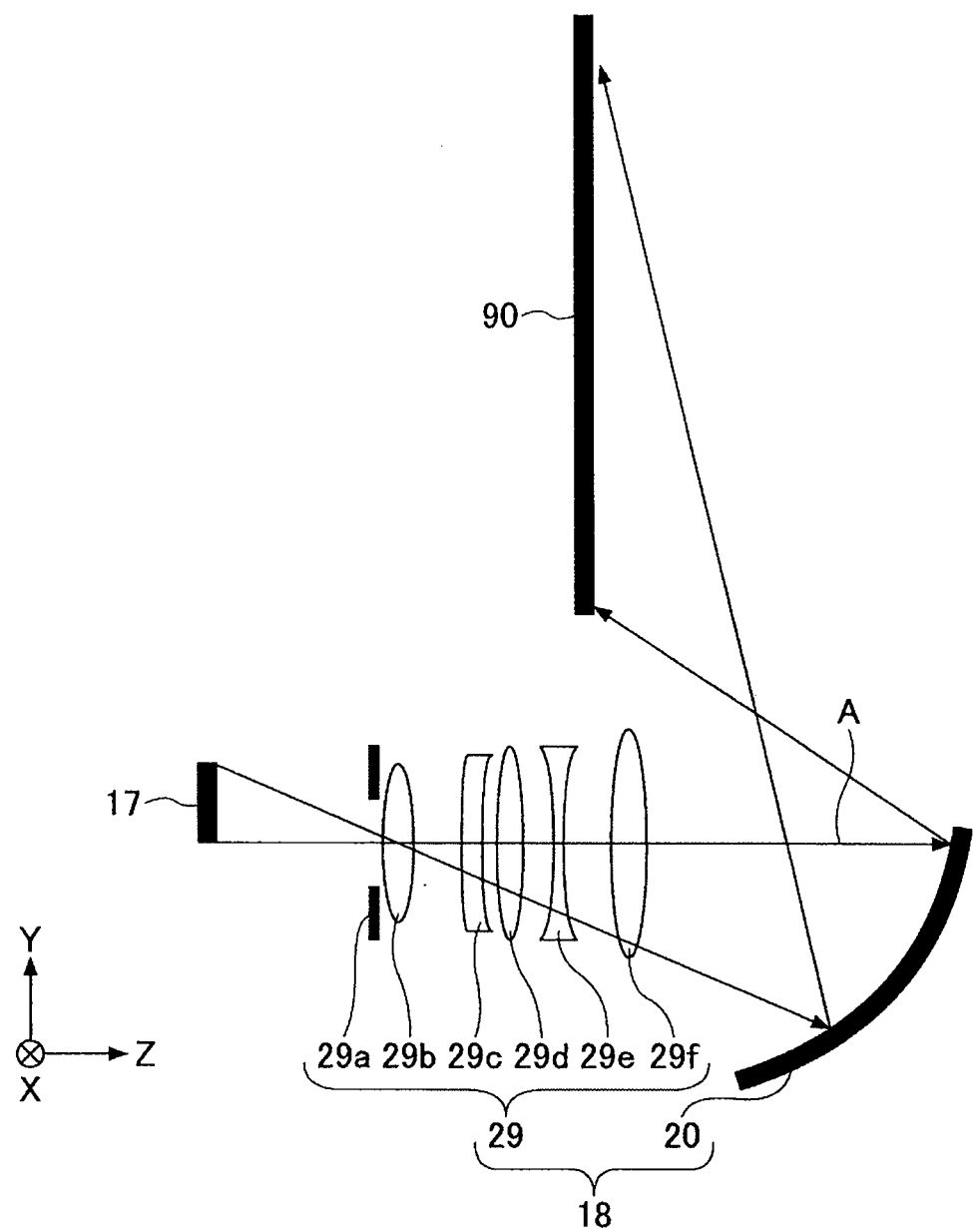
FIG. 16 is a diagram (part 2) illustrating focus adjustment in the optical projection system according to the second embodiment.
Figure 17:
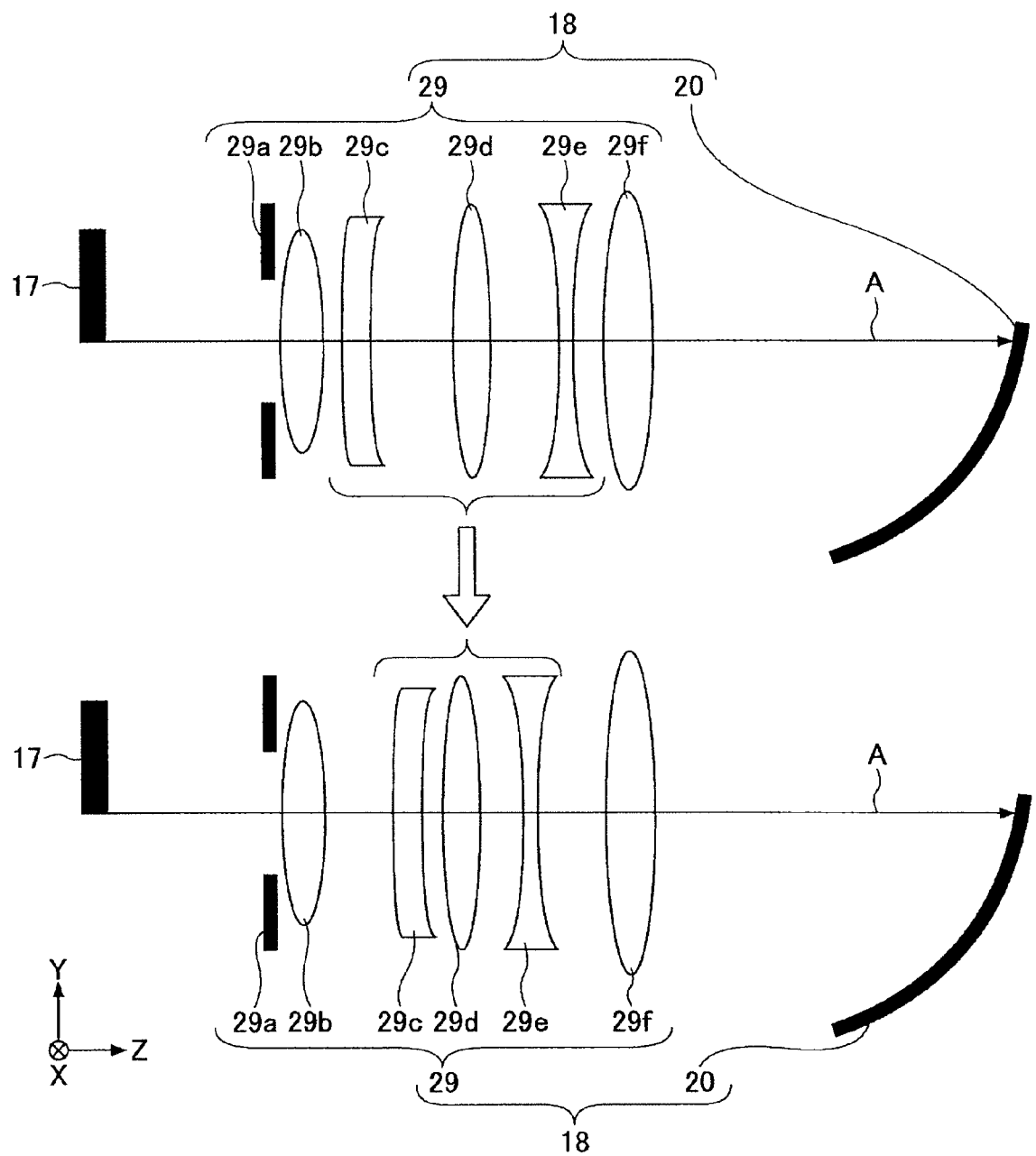
FIG. 17 is a diagram (part 3) illustrating focus adjustment in the optical projection system according to the second embodiment.

If the screen 90 is moved from a position illustrated in FIG. 15 closer to the concave mirror 20 side as illustrated in FIG. 16 so as to implement a smaller screen sized projection, and the focus is adjusted at the same time, the lens groups 29c, 29d and 29e are moved in the Z-axis direction (i.e., the optical "A" axis direction) as illustrated in FIG. 17. More specifically, the lens group 29c is moved in the Z-axis direction (i.e., the optical "A" axis direction) such that the lens group 29c moves away from the aperture stop 29a, the lens group 29d is moved in the Z-axis direction (i.e., the optical "A" axis direction) such that the lens group 29d moves closer to the aperture stop 29a, and the lens group 29e is moved in the Z-axis direction (i.e., the optical "A" axis direction) such that the lens group 29e moves closer to the aperture stop 29a.

The lens group 29e has the strongest negative refractive power specifically such that the lens group 29e may be able to generate a larger amount of pincushion distortion. Since the amount of distortion in the intermediate image 17a may be lowered by moving the lens group 29e, capable of generating a large amount of pincushion distortion closer to the aperture stop 29a, the trapezoidal distortion such as the image 90a illustrated in FIG. 9 may be suppressed. Note that if the screen 90 is moved away from the concave mirror 20 so as to implement a larger screen sized projection, and the focus is adjusted at the same time, contrary to the case in FIG. 17, the lens group 29c may be moved in the Z-axis direction (i.e., the optical "A" axis direction) such that the lens group 29c moves closer to the aperture stop 29a, the lens group 29d may be moved in the Z-axis direction (i.e., the optical "A" axis direction) such that the lens group 29d moves away from the aperture stop 29a, and the lens group 29e may be moved in the Z-axis direction (i.e., the optical "A" axis direction) such that the lens group 29e moves away from the aperture stop 29a.

Thus, in the second embodiment, the coaxial optical system 29 employs a floating focus adjusting system, in which the focus is adjusted by moving the plural lens groups within the coaxial optical system 29 in amounts differing from one another in the Z-axis direction (i.e., the optical "A" axis direction). When the screen 90 is moved closer to the concave mirror 20 side so as to implement a smaller screen sized projection, and the focus is adjusted at the same time, the lens group 29c that is arranged closest to the aperture stop 29a among the lens groups that have negative refractive power is moved reciprocally in the Z-axis direction (i.e., the optical "A" axis direction), such that the lens group 29c moves away from the aperture stop 29a, the lens group 29d that is arranged closest to the aperture stop 29a among the lens groups that have positive refractive power is moved reciprocally in the Z-axis direction (i.e., the optical "A" axis direction), such that the lens group 29d moves closer to the aperture stop 29a, and the lens group 29e that is arranged closest to the concave mirror 20 among the lens groups that have negative refractive power and are configured to reciprocally move is moved in the Z-axis direction (i.e., the optical "A" axis direction), such that the lens group 29e moves closer to the aperture stop 29a. With this configuration, the pincushion distortion of the intermediate image 17a may be suppressed, and the trapezoidal image distortion of the image on the screen 90 may be suppressed.

Further, when the screen 90 is moved away from the concave mirror 20 so as to implement a larger screen sized projection, and the focus is adjusted at the same time, contrary to the above case, the lens group 29c may be moved in the Z-axis direction (i.e., the optical "A" axis direction) such that the lens group 29c moves closer to the aperture stop 29a, the lens group 29d may be moved reciprocally in the Z-axis direction (i.e., the optical "A" axis direction) such that the lens group 29d moves away from the aperture stop 29a, and the lens group 29e may be moved reciprocally in the Z-axis direction (i.e., the optical "A" axis direction) such that the lens group 29e moves away from the aperture stop 29a. With this configuration, a large amount of pincushion distortion of the intermediate image 17a may be generated, and the trapezoidal image distortion of the image on the screen 90 may be suppressed.

Further, the distortion may be converged by significantly moving the lens group 29e, and the focal shift caused by excessive movement as a driving focus may be corrected by moving the lens group 29c configured to generate less amount of distortion in a direction opposite to the direction in which the lens group 29e is moved, while moving the lens group 29d configured to generate less amount of distortion in the same direction as the direction in which the lens group 29e is moved. That is, it may be possible to significantly move the lens group 29e by arranging the lens groups 29c and 29d configured to generate less amount of distortion.

Note that if an extremely large distortion is generated by increasing negative refractive power of the lens group 29e or by significantly moving the lens group 29e, a significant amount of the focus may need to be adjusted by utilizing other lens groups. In this case, the focus adjustment may be implemented without generating excessive distortion by moving the lens group 29c having weak negative refractive power and the lens group 29d having weak positive refractive power in mutually opposite directions.

Third Embodiment

Figure 18:
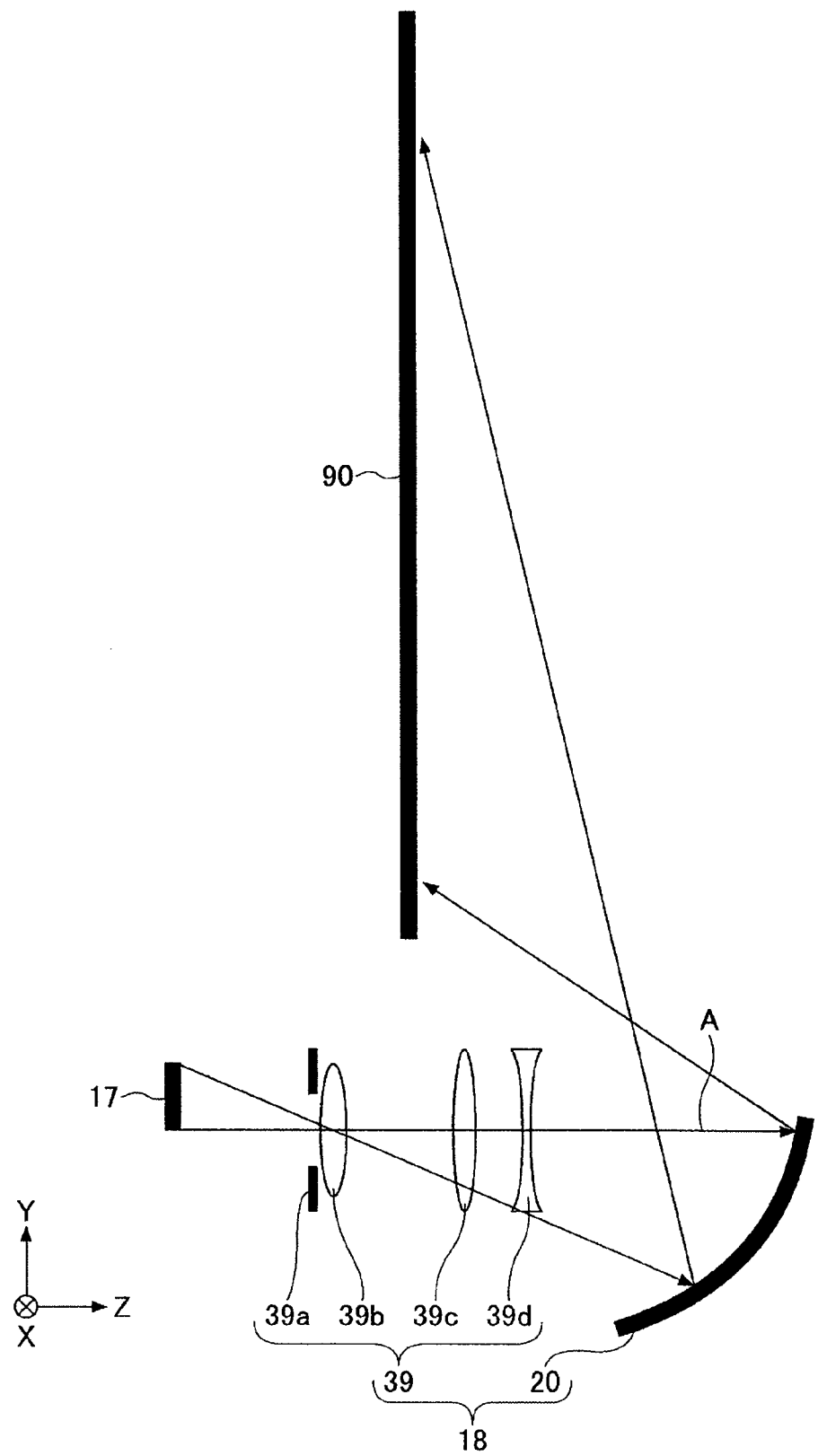
FIG. 18 is a diagram (part 1) illustrating focus adjustment in an optical projection system according to a third embodiment.

In a third embodiment, a coaxial optical system 39 of the optical projection system 18 includes a configuration illustrated in FIG. 18. That is, the coaxial optical system 39 in this embodiment includes an aperture stop 39a, lens groups 39b, 39c and 39d that are arranged in this order from the image forming element 17 side. Note that illustration of components identical to those illustrated in the first or the second embodiment may be omitted from the third embodiment.

In the coaxial optical system 39, the lens group 39b includes positive refractive power. The lens group 39c includes positive refractive power. The lens group 39d includes negative refractive power.

The lens group 39b is fixed whereas the lens groups 39c and 39d are configured to move independently from each other and reciprocally move in the Z-axis direction (i.e., the optical "A" axis direction). That is, the coaxial optical system 39 employs a floating focus adjusting system, in which the focus is adjusted by moving the plural lens groups (lens groups 39c and 39d) in amounts differing from each other in the Z-axis direction (i.e., the optical "A" axis direction).

Note that the lens group 39c is one of the lens groups having positive refractive power and configured to reciprocally move in the Z-axis direction, which is arranged closest to the aperture stop 39a. The lens group 39d is one of the lens groups having negative refractive power and configured to reciprocally move in the Z-axis direction, which is arranged closest to the concave mirror 20.

The aperture stop 39a is arranged at a position closer to the image forming element 17 than the lens group 39d that is arranged closest to the concave mirror 20 among the lens groups that have negative refractive power and are configured to reciprocally move in the Z-axis direction. Note that it is preferable to arrange the aperture stop 39a at a position closer to the image forming element 17 as illustrated in FIG. 18, so as to generate a large amount of pincushion distortion.

Figure 19:
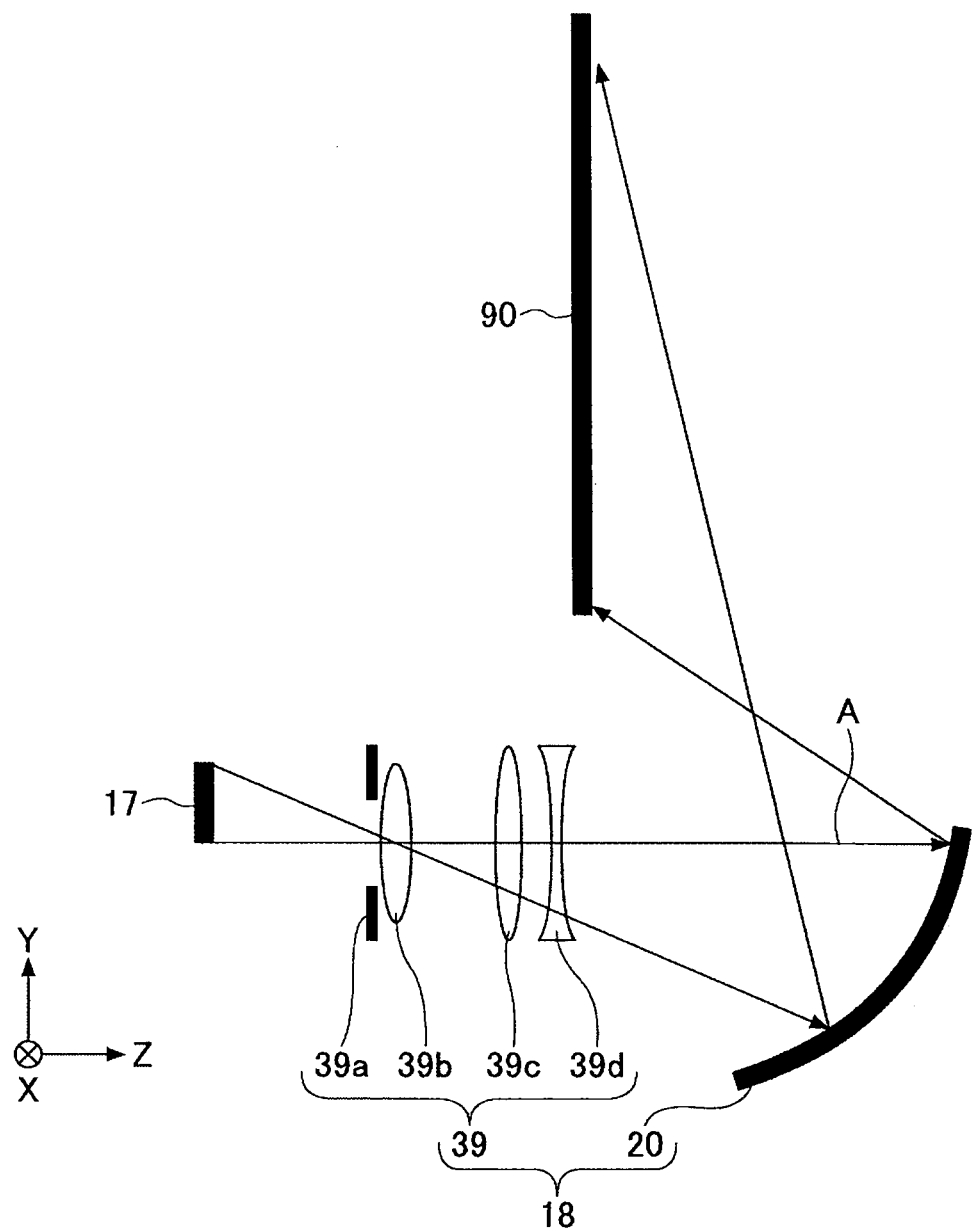
FIG. 19 is a diagram (part 2) illustrating focus adjustment in the optical projection system according to the third embodiment.
Figure 20:
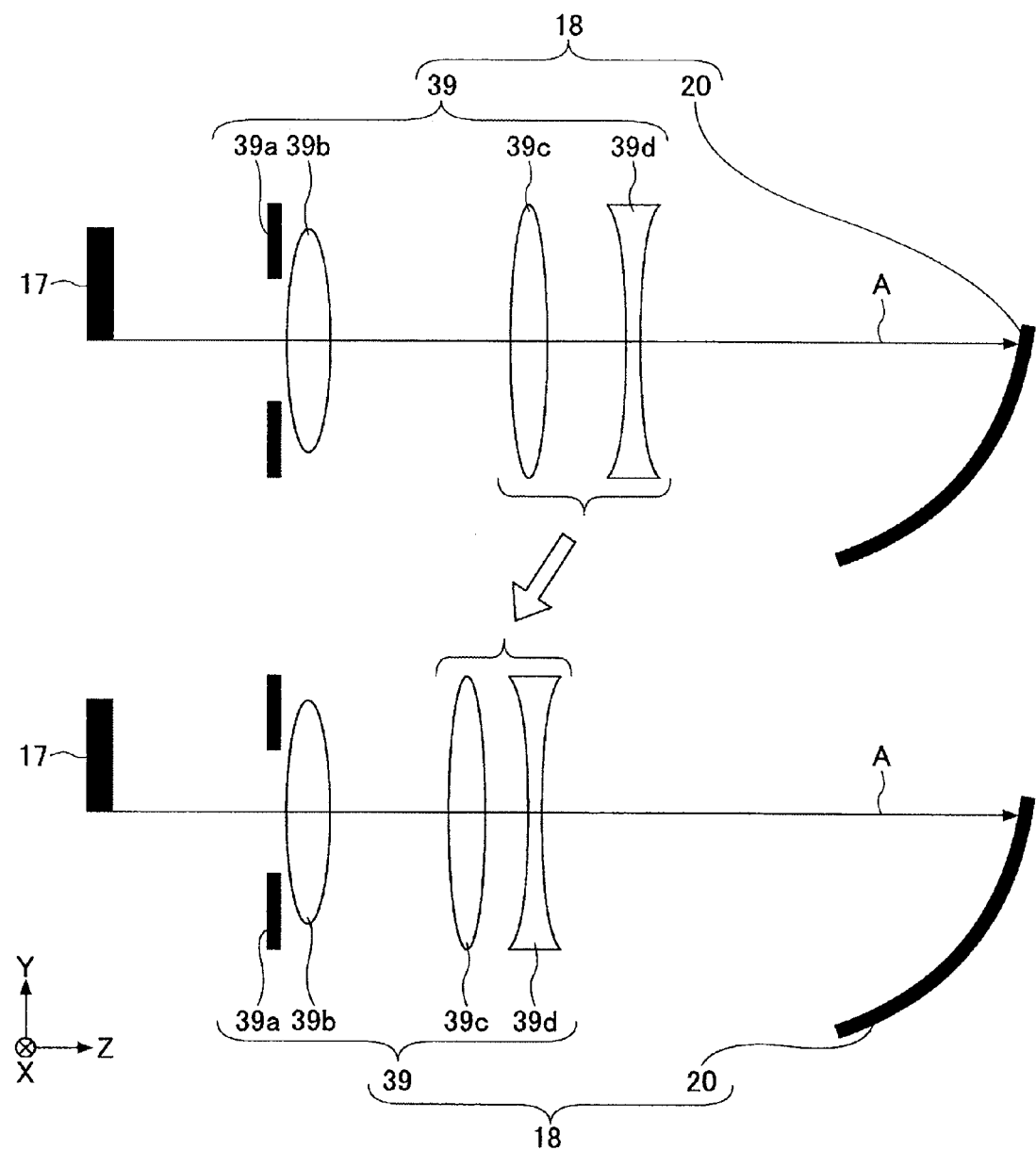
FIG. 20 is a diagram (part 3) illustrating focus adjustment in the optical projection system according to the third embodiment.

If the screen 90 is moved from a position illustrated in FIG. 18 closer to the concave mirror 20 side as illustrated in FIG. 19 so as to implement a smaller screen sized projection, and the focus is adjusted at the same time, the lens groups 39c and 39d are moved in the Z-axis direction (i.e., the optical "A" axis direction) as illustrated in FIG. 20.

The lens group 39d has the strongest negative refractive power specifically such that the lens group 39d may be able to generate a larger amount of pincushion distortion. Since the amount of distortion in the intermediate image 17a may be reduced by moving the lens group 39d capable of generating a large amount of pincushion distortion closer to the aperture stop 39a, the trapezoidal distortion such as the image 90a illustrated in FIG. 9 may be suppressed. Note that if the screen 90 is moved away from the concave mirror 20 so as to implement a larger screen sized projection, and the focus is adjusted at the same time, contrary to the case in FIG. 20, the lens groups 39c and 39d may be moved in the Z-axis direction (i.e., the optical "A" axis direction) such that the lens groups 39c and 39d move away from the aperture stop 39a.

Thus, in the third embodiment, the coaxial optical system 39 employs a floating focus adjusting system, in which the focus is adjusted by moving the plural lens groups within the coaxial optical system 39 in amounts differing from each other in the Z-axis direction (i.e., the optical "A" axis direction). When the screen 90 is moved closer to the concave mirror 20 side so as to implement a smaller screen sized projection, and the focus is adjusted at the same time, the lens group 39c that is arranged closest to the aperture stop 39a among the lens groups that have positive refractive power is moved reciprocally in the Z-axis direction (i.e., the optical "A" axis direction), and the lens group 39d that is arranged closest to the concave mirror 20 among the lens groups that have negative refractive power is moved reciprocally in the Z-axis direction (i.e., the optical "A" axis direction). Accordingly, the lens group 39c and the lens group 39d move closer to the aperture stop 39a. With this configuration, the pincushion distortion of the intermediate image 17a may be suppressed, and the trapezoidal image distortion of the image on the screen 90 may be suppressed.

Further, when the screen 90 is moved away from the concave mirror 20 so as to implement a larger screen sized projection, and the focus is adjusted at the same time, contrary to the above case, the lens groups 39c and 39d may be moved in the Z-axis direction (i.e., the optical "A" axis direction) such that the lens groups 39c and 39d move away from the aperture stop 39a. Note that the amounts of movements of the lens groups 39c and 39d may be different. With this configuration, the pincushion distortion of the intermediate image 17a may be suppressed, and the trapezoidal image distortion of the image on the screen 90 may be suppressed.

Further, the distortion may be converged by significantly moving the lens group 39d, and the focal shift caused by excessive amount of movement as a driving focus may be corrected by moving the lens group 39c configured to generate less amount of distortion in the same direction as the direction in which the lens group 39d is moved. That is, it may be possible to significantly move the lens group 39d by arranging the lens group 39c configured to generate less amount of distortion.

Note that if an extremely large distortion is generated by increasing negative refractive power of the lens group 39d or by significantly moving the lens group 39d, a significant amount of the focus may need to be adjusted by utilizing other lens groups. In this case, the focus adjustment may be implemented without generating excessive distortion by moving the lens group 39c having weak negative refractive power in the same direction as the direction in which the lens group 39d is moved.

Fourth Embodiment

Figure 21:
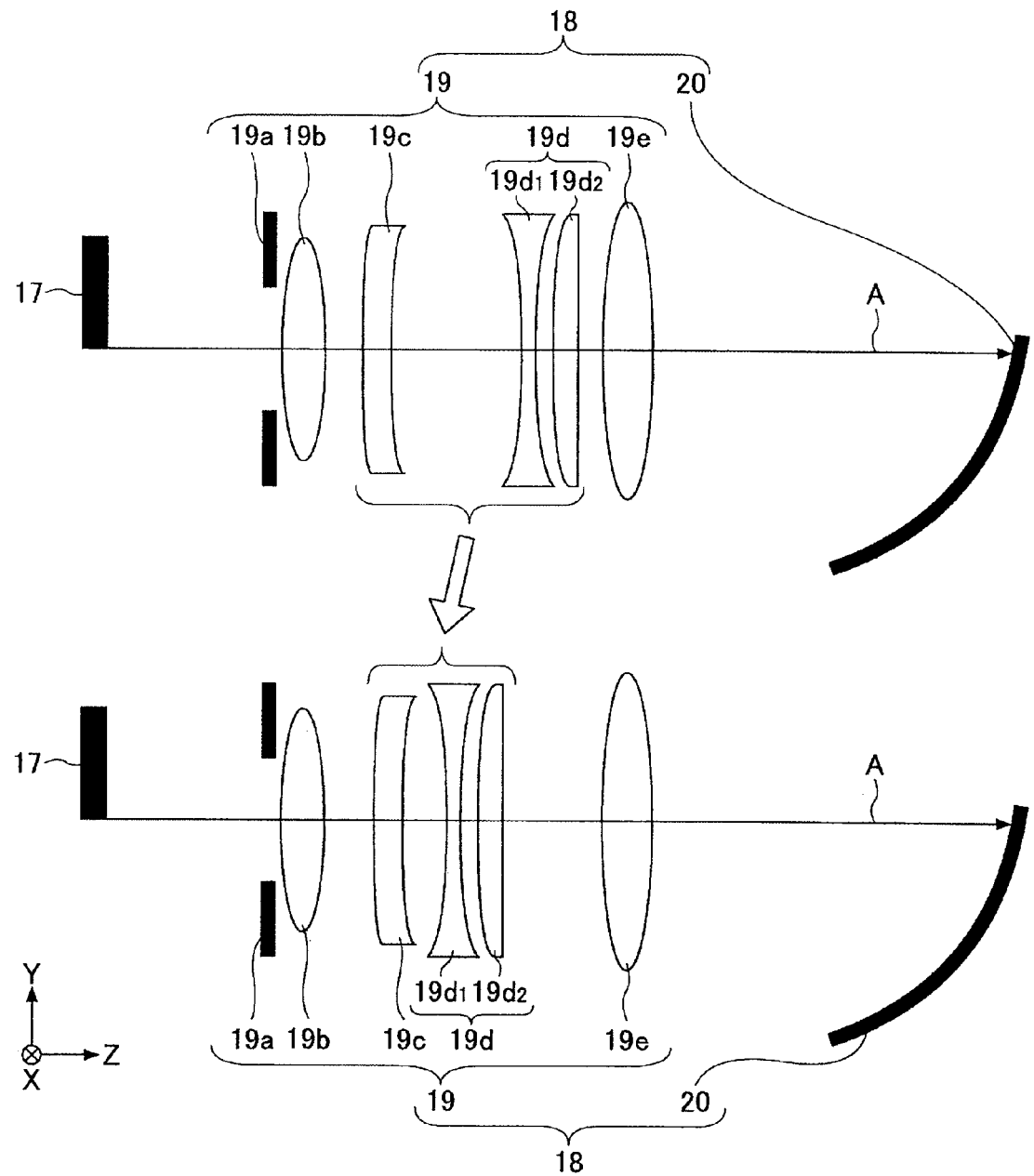
FIG. 21 is a diagram illustrating modification of the focus adjustment in the optical projection system according to the first embodiment.

In a fourth embodiment, which is a modification of the first embodiment, the lens group 19d in the first embodiment is configured to include a glass lens 19d1 having strong negative refractive power and a plastic lens 19d2 having weak positive refractive power arranged adjacent to the glass lens 19d1 as illustrated in FIG. 21. Note that illustration of components identical to those illustrated in the first, second or third embodiment may be omitted from the third embodiment.

The lens having strong negative refractive power for generating large distortion is highly sensitive to being affected by shape errors or imposition error, so that degradation of resolution or the focal shift for each screen position may easily occur in the lens having strong negative refractive power. Specifically, since the temperature inside the image projector is high, degradation of resolution or the focus change due to the temperature change occurring, even in a component made of glass having a small linear expansion coefficient, may not be overlooked.

Thus, it may be necessary to include a lens having positive refractive power that cancels out the deterioration of resolution (i.e., degradation of the distortion) or a focus change occurring in the glass lens having strong negative refractive power.

Further, in the image projector, the temperature distribution may occur in the optical axis direction inside the lens tube that holds the lenses. Hence, the temperature is high on the image forming element 17 side. Accordingly, the lens having positive refractive power are preferably arranged at a position closer to the lens having negative refractive power.

If the glass lens having positive refractive power with an absolute value at the same level as the glass lens having negative refractive power are arranged close, distortion change and the focus change due to the temperature change of the lens having negative refractive power may be cancelled out. However, if the lens having strong positive refractive power is arranged adjacent to the lens having negative refractive power, the refractive amount in each of the lenses is large, which undesirably increases the sensitivity of the imposition error between the lens having positive refractive power and the lens having negative refractive power. Thus, it is undesirable to arrange the lens having strong positive refractive power adjacent to the lens having negative refractive power.

In view of the aforementioned factors, the glass lens 19d1 having strong negative refractive power is arranged adjacent to the plastic lens 19d2 having weak positive refractive power in the fourth embodiment. With this configuration, it may be possible to lower the sensitivity of the imposition error. In addition, since the linear expansion coefficient of the plastic is approximately 10 times higher than that of the glass, the distortion or the focus change occurring due to temperature change of the glass lens 19d1, having strong negative refractive power, may be cancelled out by the plastic lens 19d2.

Accordingly, the fourth embodiment may exhibit similar advantages as those of the first embodiment; however, the fourth embodiment may further exhibit the following advantages. That is, it may be possible to lower the sensitivity of the imposition error by arranging the glass lens 19d1 having strong negative refractive power adjacent to the plastic lens 19d2 having weak positive refractive power. In addition, it may be possible to cancel out the distortion or the focus change occurring due to the temperature change of the glass lens 19d1 having strong negative refractive power by the plastic lens 19d2.

According to the aforementioned embodiments, the optical projection system capable of correcting distortion generated at focus adjustment and the image projector having such an optical projection system may be provided.

According to the aforementioned embodiments, the image projector includes the image forming element configured to form an image based on modulating signals, and the optical projection system configured to emit light from a light source and project the image formed by the image forming element as an enlarged image on the projection surface.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2010-282684 filed on Dec. 20, 2010, the entire contents of which are hereby incorporated herein by reference.

What is claimed is:

1. An optical projection system for projecting an enlarged image on a projection surface, the optical projection system, comprising:
    an image forming element configured to form an image to be enlarged by the optical projection system; and
    a coaxial optical system and a concave mirror arranged in this order on an optical path from the image forming element to the projection surface, the coaxial optical system including a plurality of lens groups and an aperture stop that share an optical axis,
    wherein the lens groups include a first lens group and other lens groups, the first lens group having a negative refractive power and configured to independently move in an optical axis direction for adjusting a focus of the optical projection system,
    wherein the aperture stop is arranged at a position closer to the image forming element than the first lens group, the first lens group being arranged closest to the concave mirror among the lens groups having a negative refractive power,
    wherein if the other lens groups have negative refractive power, the focus is adjusted by moving the first lens group in a predetermined direction of the optical axis direction while moving the other lens groups in a direction opposite to the predetermined direction of the optical axis direction,
    wherein if the other lens groups have positive refractive power, the focus is adjusted by moving the first lens group in the predetermined direction of the optical axis direction while moving the other lens groups in a direction the same as the predetermined direction of the optical axis direction, and
    wherein if the other lens groups include a second lens group having positive refractive power and a third lens group having negative refractive power, the focus is adjusted by moving the first lens group in the predetermined direction of the optical axis direction while moving the second lens group in a direction the same as the predetermined direction of the optical axis direction and the third lens group in a direction opposite to the predetermined direction of the optical axis direction.

2. The optical projection system as claimed in claim 1, wherein the first lens group has a strongest negative refractive power among the lens groups having the negative refractive power.

3. The optical projection system as claimed in claim 1, wherein the concave mirror is a free-form surface mirror, and wherein when a horizontal direction of the projection surface is defined as an X-axis direction and a vertical direction of the projection surface is defined as a Y-axis direction, curvature of the concave mirror in the X-axis direction increases as values of coordinates in the Y-axis direction increase from an end of the concave mirror that resides in a position closest from the optical axis of the coaxial optical system toward an end of the concave mirror that resides in a position farthest from the optical axis of the coaxial optical system.

4. The optical projection system as claimed in claim 1, wherein the aperture stop is arranged closest to the image forming element in the coaxial optical system.

5. The optical projection system as claimed in claim 1, wherein the optical axis of the coaxial optical system and a center of the image forming element are eccentrically located in a vertical direction of the projection surface.

6. The optical projection system as claimed in claim 1, wherein the lens group having a strongest negative refractive power among the lens groups having the negative refractive power is formed of a glass lens, and
    wherein the plurality of the lens groups further includes a plastic lens having positive refractive power with an absolute value smaller than an absolute value of the strongest negative refractive power.

7. The optical projection system as claimed in claim 1, wherein the concave mirror is fixed.

8. An image projector, comprising:
    the optical projection system as claimed in claim 1,
    wherein the image forming element is configured to form the image based on modulating signals, and the optical projection system is configured to emit light from a light source to the image forming element to enlarge the image formed by the image forming element and project the enlarged image on the projection surface.

* * * * *